No. 650,621. Patented May 29, 1900.
A. L. STEVENS.
VEHICLE WHEEL TIRE.
(Application filed Nov. 3, 1899.)
(No Model.)
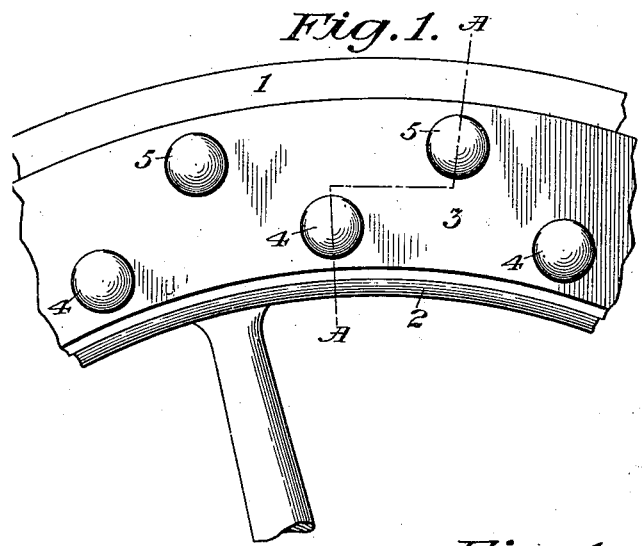
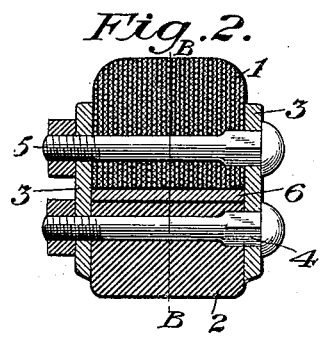
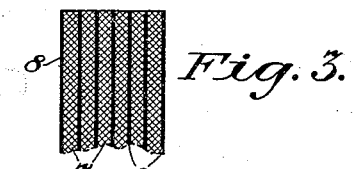
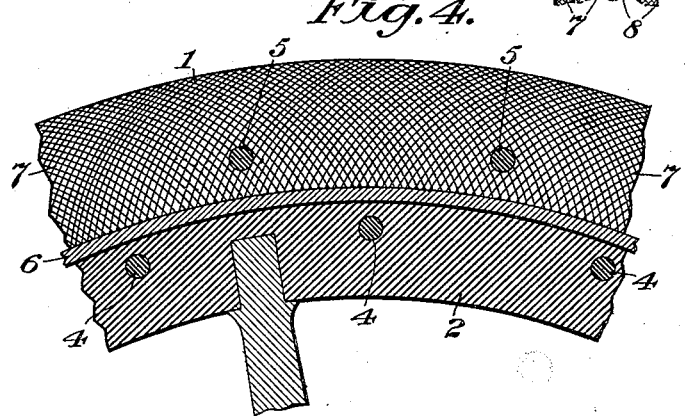
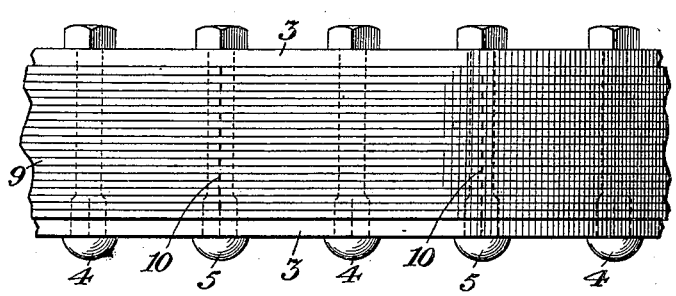
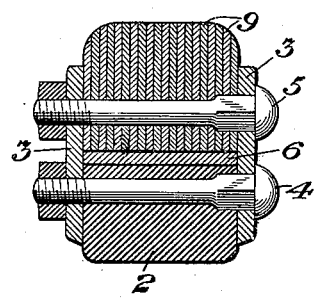
Witnesses
Inventor
Arthur L. Stevens
By his Attorney Alvin K. Goodwin

UNITED STATES PATENT OFFICE.

ARTHUR L. STEVENS, OF NEW YORK, N. Y.

VEHICLE-WHEEL TIRE.

SPECIFICATION forming part of Letters Patent No. 650,621, dated May 29, 1900.

Application filed November 3, 1899. Serial No. 735,668. (No model.)

*To all whom it may concern:*

Be it known that I, ARTHUR L. STEVENS, a citizen of the United States of America, residing at the city of New York, borough of Manhattan, State of New York, have invented certain new and useful Improvements in Vehicle-Wheel Tires, of which the following is a specification.

This invention relates to tires for vehicle-wheels, and more particularly for motor-vehicle wheels, which sustain considerable weight and require most effective traction on the pavement or road.

It is the special object of my invention to provide a comparatively-inexpensive vehicle-wheel tire having great strength and durability, comparatively-light weight, the requisite elasticity, and maximum tractive effect on all grades of dry or wet and slippery roads. In attaining this object I promote the safety and certainty of travel, thus avoiding dangers and delays to vehicle occupants. I also reduce the first cost of vehicle running-gear and save much of the serious expense for repairs and renewals attending use of heavy pneumatic tires on vehicles of the "automobile" class.

The invention will first be described and then will be particularly defined in claims hereinafter set forth.

In the accompanying drawings, forming part of this specification, Figure 1 is a side elevation of a portion of a vehicle-wheel rim having a preferred improved tire. Fig. 2 is a transverse section thereof on the irregular line A A in Fig. 1. Fig. 3 is a much enlarged section of a fragment of the tire shown in Figs. 1 and 2. Fig. 4 is a detail sectional view in the plane of the wheel and taken on the line B B in Fig. 2, and Figs. 5 and 6 are respectively peripheral and cross-sectional views illustrating another method of building up the tire.

Referring first to Figs. 1 to 4 of the drawings, the numeral 1 indicates the improved tire. 2 is the wheel felly or rim. 3 3 are opposing flange-plates made, preferably, of metal and in this instance securely fastened by bolts 4 to opposite sides of the felly. The flange-plates project outward beyond the felly to receive the tire between them and provide for effective fastening of it to the wheel-rim. For this purpose I prefer to use bolts 5, passed transversely through the flange-plates and through holes specially provided for them in the tire. The tire may rest directly on a metal felly; but with a wood felly and as a binder for it I prefer to use a metal band 6, peripherally fitting the felly and also forming a bed-plate supporting the tire. Said bolts 5, with the flange-plates 3 3, securing the tire, and the bolts 4, holding these plates to the wood felly, assure a wheel having great strength, with comparatively-light weight for the hard service required of it when used for automobiles.

As shown in Figs. 1 to 4, the tire is formed of layers 7 of woven fabric, such as canvas or substantially-similar material, with interposed or alternating layers of a rubber or rubber-compound adhesive or binder 8. These alternating layers of woven fabric and rubber adhesive are laid or built up in a mold and are vulcanized therein under pressure into one practically-homogeneous tire structure of requisite form for attachment to the wheel-rim, as above described, and preferably having the rounded outer corners shown in Fig. 2 of the drawings. The fragmentary cross-sectional view of Fig. 3 shows, on a much-enlarged scale, portions of but six fabric layers 7 and seven adhesive or binder layers 8, the main object of this view being to indicate that the rubber adhesive is preferably as thin or light as may be used to agglutinate or bind the woven-fabric layers into one compact and practically-homogeneous laterally-laminated tire structure presenting its woven-fabric and rubber-adhesive layers edgewise to the road. In building up this tire I prefer to use woven-fabric strips 7 of proper width and cut on the bias. These strips are preferably stretched at their outer edge to curve them as nearly as may be to the circumferential contour of the wheel-rim, and thereby prevent undue waste of fabric in the cutting of it. This bias cutting of the fabric is important because it arranges the fabric threads or fibers at the most advantageous tangential angles in the tire structure, as shown in Fig. 4 of the drawings, to give the best tractive effect of these threads, while preventing too-near approach of either the warp or weft threads to the circumferential contour of the tire, thereby making it difficult or impossible to pull or strip the threads from the tire-tread by traction of the tire on the road, thus promoting the effectiveness and durability of the tire.

The tire shown in Figs. 5 and 6 of the drawings is built up of already-vulcanized strips or plates 9, each formed of several alternating layers of woven fabric and rubber adhesive and cut or stamped segmentally from merchantable sheet-rubber stock and with holes for the bolts 5, which fasten the tire to the rim flange-plates 3. These strips 9 are preferably laid flatwise upon each other, so as to break joints at the ends, as shown at 10 in Fig. 5, and the whole is then vulcanized under pressure in a mold into one compact tire structure having proper form for attachment to the wheel-rim by the bolts 5, as shown in Fig. 6 of the drawings.

Important operative features of the tire herein described are that the compacted edgewise-disposed woven-fabric and rubber-adhesive layers produce a tire which has a most effective traction on the pavement or road and is practically noiseless and has the necessary elasticity to assure easy travel of a vehicle and is very durable in use. The fabric and rubber layers at the extreme peripheral tread of the tire also take up and hold a sufficient quantity of gritty or sandy road particles to materially assist or augment the inherent tractive quality of said layers, and consequently a maximum tractive effect is always assured on either dry or wet pavements or roads, and dangerous sidewise slipping or swaying of the vehicle is also prevented. The compacted woven-fabric and rubber layers have such degree of elasticity that the tire instantly expands behind the point of road contact as its tread leaves the ground. Hence the tire has a tendency to automatically expel all excess of gritty particles, which if permanently lodged on its tread might lessen rather than increase the tractive effect on the road. Any possible lateral separation of the woven-fabric and rubber layers at the extreme road-contact face or tread of the tire under weight of the vehicle or load facilitates lodgment of gritty particles on the tread to maintain the best tractive results. The original compacting pressure prevents excessive lateral separation of the fabric and rubber layers at the tire-tread, and this effect is further assured by the clamping action of the plates 3 and bolts 5, which maintain the lateral laminal integrity of the tire, while securely holding it to the wheel-rim.

A further important advantage of my compacted edgewise-disposed woven-fabric and rubber layer tire is that the layers of woven fabric, at their transverse holes through which the bolts 5 pass, offer such great resistance to the circumferential drag or pull on said bolts that there is practically no danger of even a driving-wheel tire stretching its bolt-holes and tearing itself loose at the bolts. A most substantial fastening of the tire to the wheel-rim thus always is maintained, and "creeping" of the tire is effectually prevented, thereby assuring the best tractive results and the maximum durability of the tire and promoting the most positive and easy control of all movements of the vehicle.

There is practically no chance of road grit or dirt working itself into the interior of the body of this tire to quickly disrupt or destroy it, as sometimes happens with ordinary tires having an inner body and an outer circumferential envelop or tread of rubber or rubber compound or other material. I have known of instances where several pounds of road grit and dirt have thus worked in through a comparatively-small slit-puncture of such circumferential tread and between it and the inner-tire body, thus quickly throwing the wheel out of use and requiring expensive repairs. There being no such circumferentially-separable tread on my improved tire, all such delaying and expensive accidents are avoided.

Tires have heretofore been made of compacted leather pieces presenting their edges to the road; but leather is more liable to soften under weather influences and wear, and therefore is less durable than the woven-fabric and rubber-adhesive layers of my improved tire, and these leather tires also have much less elasticity. Tires comprising alternate layers of comparatively-thick cork and rubber set edgewise and covered with an envelop of rubber or asbestos also have been made; but such tires quickly wear out, because when the envelop is worn away the friable and easily-disintegrated cork is exposed to the road. The same quick wear of the tire ensues when the envelop is originally omitted and sheet or agglutinated granular cork is used with alternating rubber layers and is exposed directly to the road.

I am not aware of any prior tire composed of laterally-laminated layers of woven fabric and rubber adhesive and presenting these layers edgewise to the road; nor do I know of a tire formed of such woven-fabric and rubber edgewise-disposed layers compacted by vulcanization; nor have I seen any prior tire formed of such layers with the woven fabric cut bias to prevent stripping of the fabric threads from the tire-tread; nor do I know of any prior tire having woven fabric and rubber layers secured to a wheel-rim by fastenings which prevent creeping of the tire and also maintain its lateral laminal integrity.

I do not strictly limit myself to single alternate layers of woven fabric and rubber adhesive, as more than one layer of fabric may be used between two rubber layers and more than one rubber layer may be used between two fabric layers; but the alternate single layers of woven fabric and rubber adhesive hereinbefore described are preferred in practice.

As rubber or rubber compound is used in these tires because of its peculiar elastic and adhesive and tractive and durable qualities, it is obvious that any other substance or compound now or hereafter to be known which has such qualities in necessary degree may be substituted for rubber or its compounds within the scope of this invention and patent. The term "rubber" used in this specification is therefore to be construed as including rubber or its compounds or any other substance having substantially-similar qualities.

I claim as my invention—

1. A vehicle-wheel tire comprising compacted layers of edgewise-disposed woven fabric and a rubber adhesive.

2. A vehicle-wheel tire comprising edgewise-disposed layers of woven fabric and a rubber adhesive compacted by or during vulcanization.

3. A vehicle-wheel tire comprising compacted layers of edgewise-disposed bias-cut woven fabric and a rubber adhesive.

4. A vehicle-wheel tire comprising layers of edgewise-disposed bias-cut woven fabric and a rubber adhesive compacted by or during vulcanization.

5. A vehicle-wheel tire comprising compacted layers of edgewise-disposed woven fabric and a rubber adhesive, combined with a felly, and fastenings securing the tire to the felly and maintaining lateral laminal integrity of the tire.

6. A vehicle-wheel tire comprising compacted layers of edgewise-disposed woven fabric and a rubber adhesive, combined with a felly, flange-plates secured to the felly and projecting therefrom and laterally sustaining the compacted layer-tire, and means clamping the tire between said flange-plates.

7. A vehicle-wheel tire comprising compacted layers of edgewise-disposed woven fabric and a rubber adhesive, combined with a felly, flange-plates fastened to the felly, and bolts passed transversely through the flange-plates and tire and clamping the tire between said plates.

8. A vehicle-wheel tire comprising compacted layers of edgewise-disposed woven fabric and a rubber adhesive, combined with a felly, a bed-plate peripherally fitting the felly, flange-plates held at opposite faces of the felly and projecting beyond the bed-plate and laterally sustaining the compacted layer-tire which rests on the bed-plate and projects beyond the flange-plates, and means clamping the tire between said flange-plates.

9. A vehicle-wheel tire comprising compacted layers of edgewise-disposed woven fabric and a rubber adhesive and having transverse holes adapted to receive fastenings holding the tire to a wheel-rim.

10. A vehicle-wheel tire comprising edgewise-disposed layers of woven fabric and a rubber adhesive compacted by or during vulcanization and having transverse holes adapted to receive fastenings holding the tire to a wheel-rim.

11. A vehicle-wheel tire comprising compacted layers of edgewise-disposed bias-cut woven fabric and a rubber adhesive and having transverse holes adapted to receive fastenings holding the tire to a wheel-rim.

ARTHUR L. STEVENS.

Witnesses:
A. W. GILBERT,
DANIEL R. KENNEDY.